United States Patent [19]

Herrington

[11] 4,285,656

[45] Aug. 25, 1981

[54] TUBULAR EXTRUSION APPARATUS

[75] Inventor: F. John Herrington, Holcomb, N.Y.

[73] Assignee: Mobil Oil Corporation, New York, N.Y.

[21] Appl. No.: 109,696

[22] Filed: Jan. 4, 1980

[51] Int. Cl.³ .............................................. B29F 3/04
[52] U.S. Cl. .................................... 425/467; 264/514; 264/209.8; 264/173; 425/131.1; 425/326.1; 425/376 A; 425/380; 425/462
[58] Field of Search ........................ 264/209, 173, 514; 425/326.1, 376 R, 380, 461, 467, 197, 198, 133.1, 131.1, 376 A, 462

[56] References Cited

U.S. PATENT DOCUMENTS

| | | | |
|---|---|---|---|
| 2,766,479 | 10/1956 | Henning | 425/198 |
| 2,864,126 | 12/1958 | Henning | 425/197 |
| 2,911,676 | 11/1959 | Henning | 425/197 |
| 2,978,748 | 4/1961 | McCauley et al. | 425/380 |
| 3,321,803 | 5/1967 | Corbett | 425/133.1 |
| 3,447,204 | 6/1969 | Lainson | 425/133.1 |
| 3,608,136 | 9/1971 | Tripptrap | 425/461 |

Primary Examiner—Jeffery R. Thurlow
Attorney, Agent, or Firm—Charles A. Huggett; Michael G. Gilman; James F. Powers, Jr.

[57] ABSTRACT

An apparatus is provided to ensure uniform distribution of molten thermoplastic resin around a tubular die annulus upon extrusion of a thermoplastic tube. The apparatus comprises a toroidal chamber surrounding the die into which the molten resin is fed from one side, and a plurality of ports through which the molten plastic flows out of that chamber toward the die annulus. The cross-sectional area of each of the ports is gradually increased from a point adjacent the entry of the molten resin to a maximum feed port cross-section at a point 180° from the resin entry point. This arrangement ensures a more uniform molten resin distribution around the die annulus during extrusion.

1 Claim, 2 Drawing Figures

TUBULAR EXTRUSION APPARATUS

BACKGROUND OF THE INVENTION

1. Field of the Invention

The present invention relates to an apparatus which may be employed in the extrusion of thermoplastic materials such as thermoplastic films for packaging, and the like. More specifically, an apparatus is provided which ensures uniform molten resin flow distribution through a tubular extrusion die.

2. Description of the Prior Art

In the prior art techniques for the extrusion of thermoplastic tubular material, solid thermoplastic resin is fed into an extrusion apparatus wherein the resin is heated and becomes molten. The molten resin is continuously mixed and forwarded to the exit end of the extruder by a rotating screw device within the confines of the extruder barrel. The molten resin is then forced through an adaptor into a tubular extrusion die, and the molten resin is expressed from the die in the form of a tube. The extruded tube is drawn from the die, usually by a pair of positively driven nip rollers, which are located downstream from the die orifice. The tubular extrusion die may be fed with molten resin either from the center of its base, i.e. center-fed, or the die may be fed through an orifice located along the side of the die, i.e. side-fed. In the case of the center-fed design, the molten thermoplastic resin from the extruder is fed into the center of the bottom of the die, where it is divided and conducted radially through channels to positions around the die annulus. Such an arrangement provides for good uniformity of resin distribution around the interior cylindrical mandrel of the die. The resin distribution in the case of a center-fed die is superior to the distribution uniformity achieved in a conventional side-fed die apparatus.

A side-fed die design is frequently required however, for various mechanical configuration considerations including cases where a tubular die must have a continuous hole in its center, for example, where a rotating shaft must extend through the die to drive a machine within the film bubble, or where several tubes must extend through the die to conduct liquid in and out of the bubble; or in the case of coextrusion wherein a plurality of thermoplastic layers are fed through the die so that they all emerge in laminar relationship through a single annular outlet orifice on the die, the latter coextrusion methods and apparatus being well known to those skilled in the art.

A conventional side-fed die has unequal path lengths, thus unequal pressure drops, for the molten resin to travel to arrive at various positions about the periphery of the die mandrel, and for this reason, it is difficult to obtain good resin distribution. Without some compensating adjustment, more resin will flow to the side of the die nearest the feed port, since it is subjected to the least pressure drop.

SUMMARY OF THE INVENTION

In accordance with the present invention, an apparatus has now been developed which achieves uniform molten resin distribution in a side-fed die apparatus. In a side-fed tubular die arrangement, molten thermoplastic resin is injected into the die side wall from the extruder at a single location or injection port on the side of the die. After passing into the die, the melt is fed into a first toroidal-shaped chamber from which it is metered by way of a number of radial ports into a second toroidal-shaped chamber. The radial ports interconnecting these two chambers are spaced apart around the circumference of the die and are conventionally uniform in cross-sectional area. In such an arrangement, the radial hole or aperture which is spaced farthest away, i.e. about 180°, from the point of melt entry through the side of the die easily becomes starved. That is, at that point, considerably less molten resin is flowing into the inner chamber when compared to the amount of resin which is flowing through the chambers which are closest to the resin input location. As a result, the distribution of molten thermoplastic around the tubular die mandrel as the molten resin exists from the die orifice is non-uniform. In accordance with the present invention, this non-uniformity of resin distribution has now been eliminated or substantially reduced by modification of the cross-sections of the respective radial apertures, whereby the cross-section of that aperture which is most remote from the point of molten resin entry into the side of the die, is larger than the apertures in closer proximity to the entry point of the resin. The cross-section of these radial apertures or flow channels is such that they increase in cross-sectional area from the ports immediately adjacent to the melt entry to a maximum diameter at the flow channel positioned about 180° from the molten resin entry point. It has been found that such an arrangement of radial apertures results in a uniform distribution of the molten resin, which is fed into the inner chamber adjacent to the die mandrel, so that the resultant extruded tube has a more uniform distribution of resin about its circumference than hitherto available with prior art side-fed dies. Additionally, such an arrangement lends itself to the improved distribution of resin in multiple thermoplastic layer constructions formed during coextrusion operations, as more particularly described hereinafter.

DESCRIPTION OF SPECIFIC EMBODIMENTS

Figure 1:
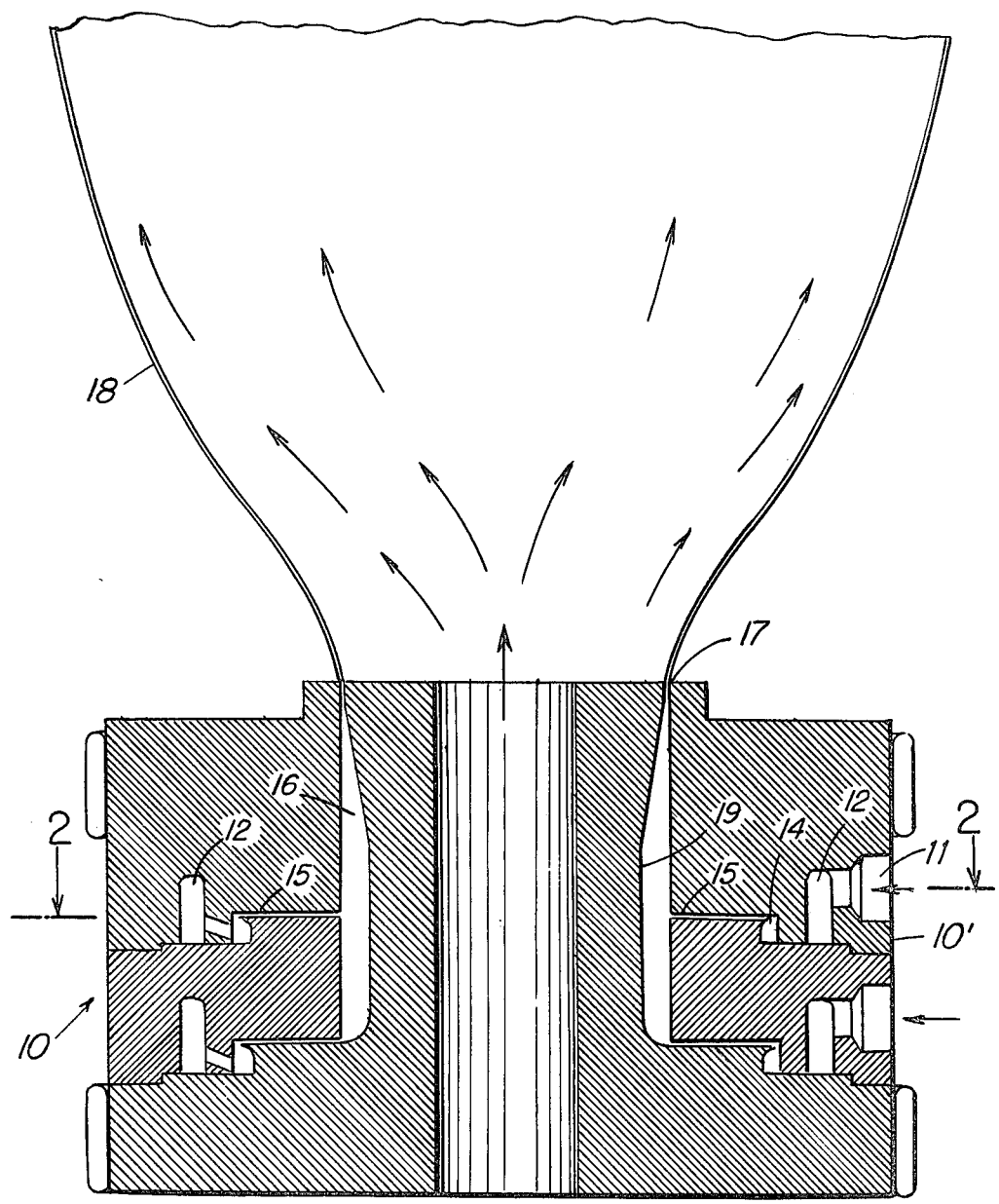
FIG. 1 is a side elevation view, in cross-section, of an embodiment of a side-fed die in accordance with the present invention.
Figure 2:
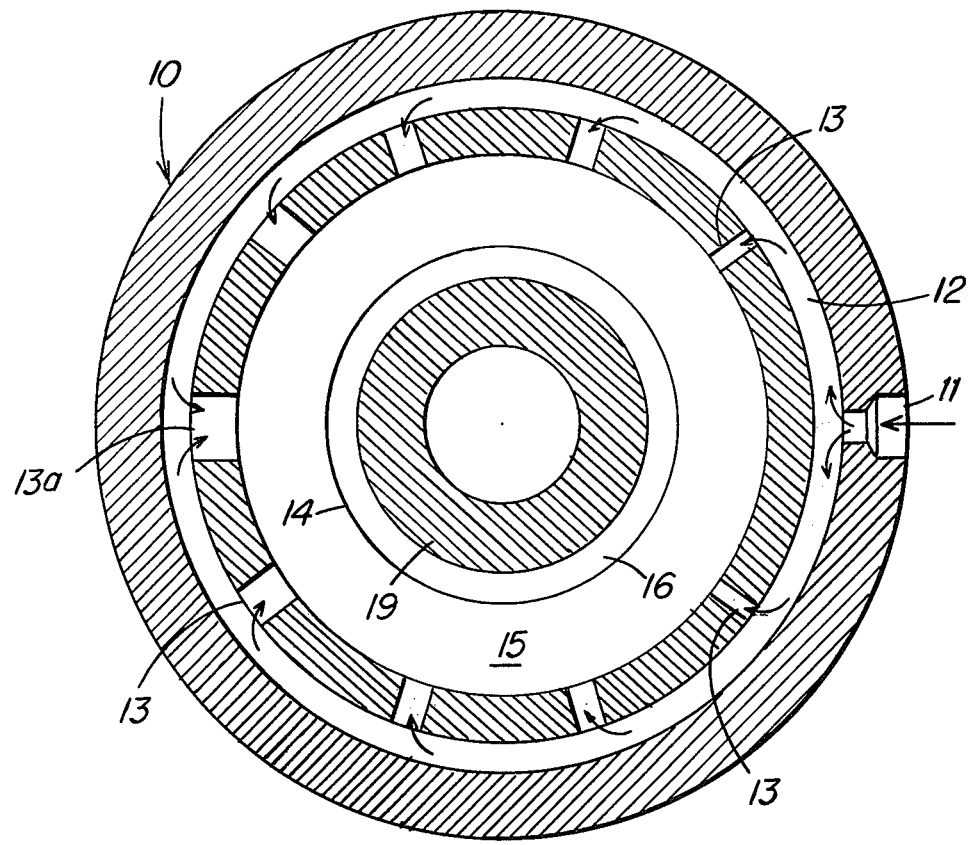
FIG. 2 is a cross-sectional view taken on line 2—2 of FIG. 1.

As shown in FIGS. 1 and 2, molten thermoplastic resin from an extruder (not shown) is fed into the side wall 10' of a tubular extrusion die 10. The embodiment illustrated in FIGS. 1 and 2 is of a tubular extrusion die designed for the extrusion of two-layer laminates. It will be understood however that in accordance with the present invention, tubular dies designed for the extrusion of monolayer films are also contemplated as well as tubular dies designed for the extrusion of multilayer laminates, i.e. having 3 or more layers.

The molten resin passes from the injection chamber 11 in the side wall 10' of die 10 into entry chamber 12 which is a torodial-shaped chamber within and encircling the outer portion of die 10. The molten resin is then passed from entry chamber 12 through flow channels 13 into inner chamber 14 which is a toroidal-shaped chamber encircling the inner part of die 10 and which is generally concentric with entry chamber 12.

As more clearly shown in FIG. 2, flow channels 13 are uniformly spaced about the wall member separating entry chamber 12 and inner chamber 14. As shown in FIG. 2, the cross-sectional area of successive flow channels 13 increases as the distance from injection chamber 11 increases, whereby the flow channel 13 member, which is spaced about 180° from injection chamber 11, has the largest cross-sectional area. This variation in cross-section of flow channels 13 results in equal pressure drop from injection chamber 11 to the downstream end of all flow channels 13. For example, the pressure drop around entry chamber 12 is less for the material flowing to a flow channel 13 that is near injection chamber 11 than it is for material flowing to a flow channel 13a that is far from injection chamber 11. The diameter of flow channel 13 is smaller than that of flow channel 13a by exactly the proper amount to provide sufficient additional pressure drop such that the total drop through entry chamber plus through flow channel is the same for all flow channels.

As the molten resin leaves inner chamber 14, it passes into the metering gap 15 which uniformly meters the now uniformly distributed molten resin into extrusion chamber 16 prior to exit of the molten resinous material through die orifice 17 in the form of a continuous tube 18, which is subsequently cooled to solidify the resin and passed onto storage for further processing, e.g. bag-making operations. As a result of the uniform flow distribution achieved by the described variation in cross-sectional areas of flow channel members 13, the molten resin is uniformly distributed about die mandrel 19 in extrusion chamber 16, and the resultant film products exhibit more uniform thickness than prior art tubular films which are extruded with flow channels which are uniform, i.e. without the cross section area gradient of the present invention.

Although ports 13 have been described and illustrated as being arranged in a radial fashion between chambers 12 and 14, it will be understood that other special arrangements depending upon the specific tubular die design may be employed, such as an axial arrangement, or the like. Additionally, dependent upon die design, chambers 12 and 14 may be reversed with chamber 12 being in closer proximity to the die mandrel than chamber 14.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A side-fed tubular extrusion die comprising:
a sidewall defining the exterior of said die, an inlet orifice in said sidewall for introducing a molten resin into said die, a first toroidal-shaped chamber located interiorly of said die in communication with said inlet for receiving a molten resin introduced through said inlet orifice, a second toroidal-shaped chamber located interiorly of said die and substantially concentric with said first chamber, an annular interior die wall separating said first and second chambers, a plurality of openings provided in and spaced along said interior die wall, said openings interconnecting said first and second chambers to allow said second chamber to receive a molten resin from said first chamber, the cross-sectional area of said openings progressively increasing from an opening closest to said inlet orifice to an opening farthest removed from said inlet orifice, a said opening closest to said inlet orifice being out of axial registration with said inlet orifice to prevent said molten resin from taking a straight path from said inlet orifice through said closest opening and into said second chamber, and an extrusion gap defined by a mandrel positioned coaxially within said die and an interior die sidewall coaxial with said mandrel, said extrusion gap receiving molten resin from said second toroidal-shaped chamber.

* * * * *